ENCODED TAG READER

Filed Dec. 14, 1966 5 Sheets-Sheet 1

INVENTORS.
Paul H. Hamisch
BY Jack I. Kern
Wood, Herron and Evans
ATTORNEYS

INVENTORS.
Paul H. Hamisch
BY Jack I. Kern
Wood, Herron & Evans
ATTORNEYS

ENCODED TAG READER

Filed Dec. 14, 1966 5 Sheets-Sheet 3

INVENTORS.
Paul H. Hamisch
Jack J. Kern
BY Wood, Herron & Evans
ATTORNEYS

INVENTORS
Paul H. Hamisch
BY Jack I. Kern
Wood, Herron & Evans
ATTORNEYS

INVENTORS.
Paul H. Hamisch
Jack J. Kern
BY Wood, Herron & Evans
ATTORNEYS

United States Patent Office 3,418,456
Patented Dec. 24, 1968

3,418,456

ENCODED TAG READER

Paul H. Hamisch, Dayton, and Jack I. Kern, Kettering, Ohio, assignors to The Monarch Marking System Company, Dayton, Ohio, a corporation of Ohio Filed Dec. 14, 1966, Ser. No. 601,688
20 Claims. (Cl. 235—61.11)

ABSTRACT OF THE DISCLOSURE

A reader for a tag having photo-sensible mark receiving positions arranged in concentric circular patterns centered about an aligned formed in the tag including a support, a probe mounted on the support and engageable with the aligner for properly positioning a tag in a read position, a scanning head mounted to the support for rotation coaxial with the probe, a light source fixed to the scanning head, a plurality of illuminating light conductors mounted for movement with the scanning head and each having first ends adjacent the light source and second ends overlying the circular patterns of a tag positioned at the read station for illuminating successive photo-sensible mark receiving positions as the scanning head rotates, and a plurality of sensing light conductors mounted for movement with the scanning head and each having an end adjacent one of the illuminating ends of the illuminating light conductors and another end cooperating with a photo-transducer for collecting light reflected from the tag and independently transmitting it to its associated photo-transducer.

This invention relates to encoded tag reading apparatus and more particularly to apparatus for reading merchandise tags having circularly arranged photosensible information imprinted thereon.

Illustrative of the general type of tag suitable for use with the reader of this invention is the tag disclosed and claimed in the copending application of Paul H. Hamisch, for "Improved Machine Readable Merchandise Tag," filed Dec. 14, 1966, Ser. No. 601,683. Briefly, the Hamisch tag includes a sheet of print stock provided with a first, or timing, circle which is divided into a plurality of contiguous timing bit positions, and a second, or information, ring which is similarly divided into a plurality of contiguous information bit positions. The information and timing bit positions are equal in number, radially aligned, and equidistant from a centrally disposed alignment hole formed in the tag. In addition to the information and timing bit positions, a start bit position is provided. The start bit position is radially aligned with one each of the information and timing bit positions at a point between the beginning and end of the encoded information.

In one particular form of the Hamisch tag, the timing and information circles are each divided in forty-six positions, with the information ring being further divided into nine character groups of five positions each. The forty-sixth information position, which is radially aligned with the start mark, is left blank to separate the first and last characters. Into each of the nine character groups are entered photosensible marks in accordance with a two-out-of-five code. These entries, when sensed, provide information signals which may include data in the form of prices, inventory numbers, or the like. Into each of the timing positions is entered a timing mark. The timing marks, in combination, generate a series of timing signals for synchronously processing, on a serial-by-bit basis, the data read from the information ring. In addition to the information and timing marks, there is provided a still further mark, termed a start mark. This mark is placed in the start position in alignment with both a timing mark and the blank information position and, when sensed, provides a control signal indicating the start of the coded information. Thus, the Hamisch tag is a self-contained machine readable unit requiring no external source of timing or start signals.

In use, as for example in a department store, the Hamisch tag is encoded with pricing information as well as a description of the time, and attached to merchandise, such as garments, boxes and the like using strings, adhesive, or other suitable fastening means. Alternatively, the tag is not a separate item, but rather comprises an integral portion of the box or carton in which the merchandise is contained. With this form of tag, the circularly arranged machine readable characters are imprinted directly on the box or carton, centered about an aligner, such as a hole or depression, formed in the container.

With either tag embodiment, the customer, when desiring to purchase an item, proceeds with the item to a combined tag-reading and checking-out station where he presents it to the station clerk. The station clerk places the tag in a tag reader which automatically reads the photosensible marks on the tag, transmitting the pricing and descriptive information to a suitable utilization device such as a combined cash register and receipt printer. The cash register in turn processes the infomation signals input thereto, providing a print-out of the price, as well as a description of the item as, for example, "coat," "hat," "tie," etc. The print-out, upon payment by the customer, constitutes his receipt or sales check.

In designing a reader for use in scanning circularly arranged information such as found on the Hamisch tag, a number of basic or primary criteria must be satisfied if the inherent advantages of the tag, such as its self-timing and automatic aligning characteristics, are to be preserved. For example, the reader must be portable. This permits the attendant at the tag reading and checking-out station to bring the reader to the tag, rather than having to bring the tag to the reader. Portability is particularly desirable where the merchandise is bulky since is avoids awkward handling of the merchandise which would otherwise be necessary.

In addition to portability, the reader should be compact and light in weight. While compactness and light weight are inherently desirable, they are especially desirable in high volume operations where frequent handling of large and heavy tag readers would tend to produce operator fatigue.

A further desideratum of a tag reader is that its operation be simple, and its use easy. A tag reader which requires no special training to use and is easy to operate has two very important advantages. Namely, it reduces the time spent training an operator, as well as enables less skilled personnel to be used as operators. Thus, unproductive training time and operator wages are held to a minimum.

Finally, the tag reader must be capable of accomplishing a nondestructive readout of the tag. In practice, it has been found that a significant proportion of items purchased in, for example, a department store, are eventually returned or exchanged. Since these items ultimately are restored to the store's stock of saleable merchandise and many eventually resold, the tags must necessarily be reread as an incident to the resale. While it is possible to reticket the merchandise prior to returning it to stock for resale, such a practice is time consuming and costly. A preferable practice is to reuse the original price tag. Therefore, it is highly advantageous that the reader not destroy the tag during the reading operation accompanying the first sale.

One tag reader for use with circularly arranged information, of which applicant is aware, satisfies the four basic or primary design criteria set forth above. That is, it is portable, compact and lightweight, easy to learn to use and operate, and does not destroy the tag as incident to reading. This reader, which is disclosed in the copending application of Herbert La Mers, for "Interpreting System," filed Feb. 25, 1963, Ser. No. 260,748, includes a probe projecting from a reader housing, and a plurality of lamp-photocell pairs. The lamp-photocell pairs are contained in a scanning head rotatably mounted in the housing and move in concentric circular paths centered about the probe, the paths each being associated with different ones of the rings of the tag.

In operation, the tip of the probe is moved into engagement with the aligner of the tag, aligning the circular tag patterns with their associated lamp-photocell scanning paths. The tag is then moved into a read position which is spaced from, but in operative photosensing relationship with, the photocell-light pairs. When the tag is properly positioned for reading, a motor is energized, driving the lamp-photocell pairs in their concentric circular scanning paths, simultaneously illuminating and sensing light reflected from their respective rings as the tag moves relative to the lamp-photocell pairs.

The La Mers reader, while satisfying the four basic or primary design criteria for reading tags bearing circularly arranged data, has certain disadvantages. For example, the La Mers reader does not permit the information and timing data on the tag to be spatially compressed to an optimum degree. Consequently, for a given amount of information, a physically larger tag is required. This result, in part, is attributable to the use of photocell-lamp pairs to directly sense and illuminate the various tag rings. When a photocell is used to directly sense light reflected from a ring on the tag, the photocell must be mounted in the rotating scanning head in proximity to the tag and at an angle corresponding to that at which light is reflected from the tag. Likewise, when a lamp is used to directly illuminate the rings on the tag, the lamp must be mounted in the rotatable scanning head in proximity to the particular ring with which it is associated. This mounting of the lamps and photocells in the scanning head, and their required proximity to the tag, which is necessary for direct sensing and illuminating, places a physical limitation on the closeness with which the rings can be spaced as well as the density of information in the rings. Consequently, the tag size necessarily increases for a given amount of information.

It has been a principal objective of this invention to provide a tag reader which, in addition to satisfying the four primary design criteria set forth earlier, also permits smaller tags to be read having high density information recorded thereon. This objective has been accomplished in accordance with the principles of this invention by providing in a reader having a scanning head mounted for rotation about a probe engageable with a tag aligner, a plurality of pairs of light conductors cooperating with a single light source. In a preferred embodiment, the pairs of conductors, which each comprise an illuminating light conductor and a sensing light conductor, are mounted in the scanning head and are associated with different ones of the circular patterns of photosensible marks. The illuminating light conductors at one end are grouped in proximity to the lamp and at their other end are individually positioned opposite different rings of a properly positioned tag, thereby illuminating, from a single lamp, a plurality of different rings. The sensing light conductors at one end are positioned adjacent their associated illuminating conductors, and at the other end are positioned adjacent different transducers, thereby sensing light reflected from their associated tag rings and transmitting it to their respective transducers. Because the ends of the sensing and illuminating light conductors adjacent the tag are small, they can be more closely spaced, permitting smaller tags with high recording densities to be read. In operation, the illuminating and sensing light conductors simultaneously illuminate, from a single source, and sense, for transmission to independent transducers, segments of their associated tag rings on a serial-by-bit basis as the segments are successively scanned by the rotating head.

An advantage of the reader of this invention is that a single source of light is used to illuminate all the tag rings. This reduces the physical size and cost of the scanning head as well as increasing its reliability since there are fewer lamps which can fail.

An additional and equally important objective of this invention has been to provide a tag reader which uniformly illuminates the marks and which enables a high level of discrimination to be achieved in the sensing operation. To this end, the illuminating and sensing light conductors of the reader are fabricated of fiber optic reeds, with the light receiving ends of the sensing reeds being surrounded by the illuminating reeds, and arranged in a bundle having a cross-section less than that of a mark. With such an arrangement, as the scanning head rotates, there is a point of travel where each mark completely obscures the sensing reeds while being uniformly illuminated by the illuminating reeds, thereby enabling the mark to be photosensed without interference from stray spots on the tag such as dirt, etc. which may happen to be adjacent the mark being sensed.

A further objective of this invention has been to provide means for transmitting the sensed information to the transducers, which does not require any electrical interconnections between the rotating scanning head and the various stationary portions of the reader. In this invention, such a result has been achieved by providing a plurality of stationary concentric annular phototransducers each in light receiving relationship to the light transmitting ends of different groups of fiber optic sensing reeds. In this manner, the light reflected from the tag rings is transmitted to the respective transducers via the rotating fiber optic sensing reeds without resort to contact brush and ring arrangements necessary when, for example, the transducer is mounted directly in the rotating scanning head.

Other objectives and advantages of this invention will be more readily apparent from a detailed description of the invention taken in conjunction with the accompanying drawings in which.

Figures 1, 2, 3:
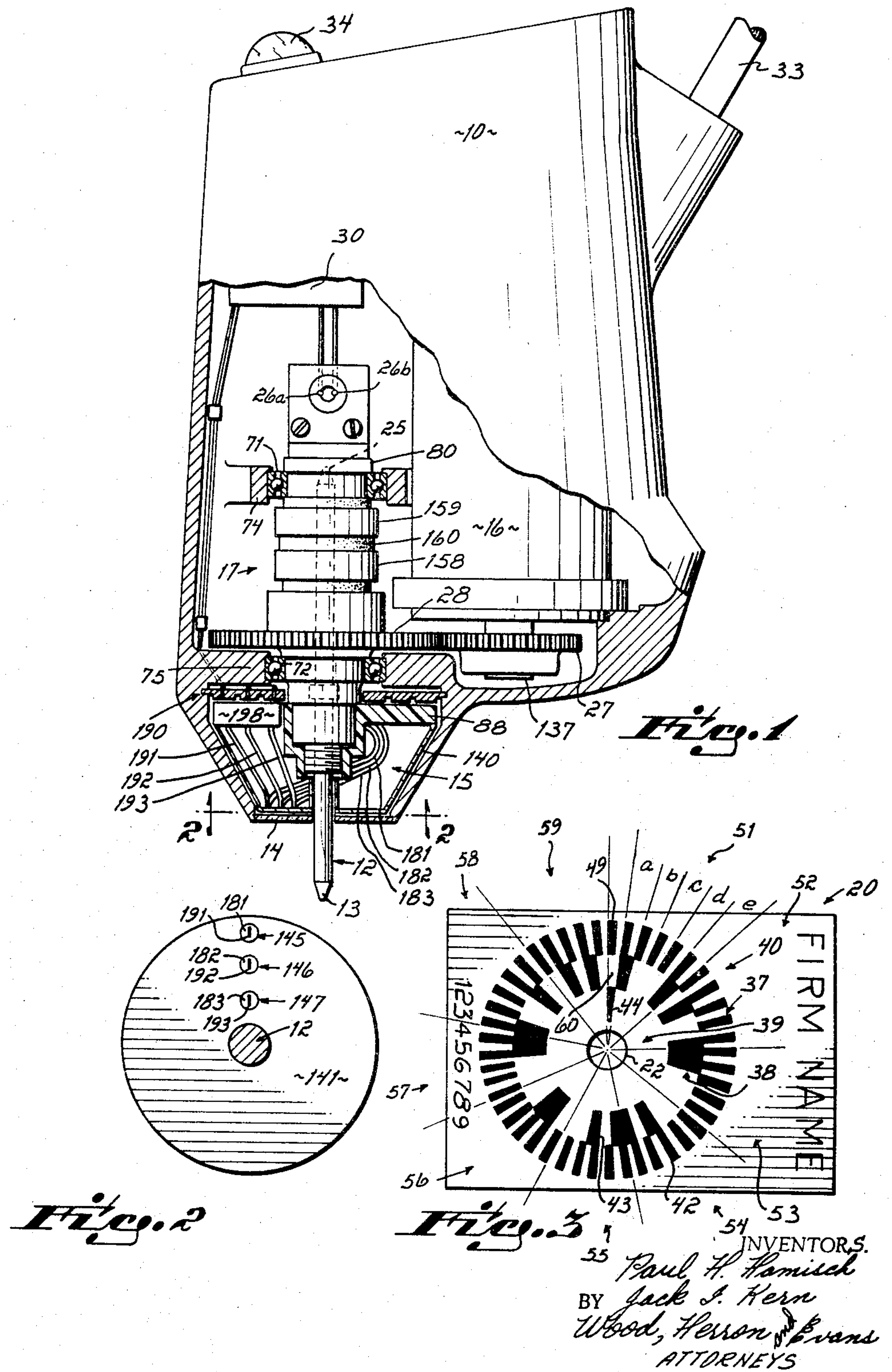
FIGURE 1 is a front elevational view partially in cross-section of a preferred embodiment of the tag reader of this invention, showing the general relationship of its principal components.
FIGURE 2 is a cross-sectional view taken along line 2—2 of FIGURE 1, showing the orientation, relative to the probe, of the lower ends of the sensing and illuminating fiber optic reeds.
FIGURE 3 is one form of machine readable tag capable of use with the reader of this invention.

A preferred embodiment of a tag reader constructed in accordance with the principles of this invention, as shown more particularly in FIGURE 1, includes a housing 10 enclosing the various operating components of a scanning assembly 17 to be described. The housing 10 is preferably manufactured of plastic and shaped in the form of a gun for the comfort of the user. The scanning assembly 17 includes a probe 12 mounted for reciprocating axial motion between a normal extended position shown in FIGURE 1, and a retracted position shown in FIGURE 4 in which a conical probe tip 13 is shifted inwardly by a tag 20 urged into a read position against a transparent annular window 14.

The reader further includes a scanning head 15 enclosed within the housing 10 and forming the lower end of the scanning assembly 17. The scanning head is rotationally driven about the probe axis by a motor 16 in response to inward movement of the probe 12 resulting from the placement of a tag 20 in the read position, and functions to sequentially sense the circularly arranged photosensible marks placed on the tag as shown in FIGURE 3. Specifically, the scanning head 15 is provided with a plurality of light conductors 181–183 and 191-193, radially aligned at different distances from the axis of the probe 12. The conductors 181–183 illuminate the tag 20 while the conductors 191—193 transmit light reflected from the tag to a set of three stationary annular phototransducers 190. When angularly driven, the scanning head 15 simultaneously illuminates and senses, in sequential fashion, the photosensible marks of the various concentric circular patterns as the lower ends of the conductors 181—183 and 191–193 sweep through concentric circular scanning paths coextensive with the concentric circular patterns of photosensible marks on tag 20.

In operation, an aligner 22 in the form of a hole, dimple or depression in the tag 20 is engaged with the conical probe tip 13 and the tag urged toward the housing 10 until the photosensible mark bearing surface 40 of the tag is brought into the read position against the outer surface of the annular window 14. In this position the concentric circular patterns of marks on the tag 20 are aligned with the lower ends of the illuminating and sensing conductors 181–183 and 191–193. As the tag 20 is moved toward the window 14, in addition to aligning the marks on the tag with the conductors 181–183 and 191–193, the probe 12 is driven inwardly in a direction parallel to its axis. When the tag 20 is properly positioned in the read position against the window 14, the probe 12 is axially displaced a distance sufficient to cause its inner end 25 to bridge a pair of contacts **26*a* and 26*b* of a switch 26, initiating operation of the motor 16. The motor 16 through suitable gears 27 and 28 rotates the scanning head 15 about the probe axis, moving the light conductors 181–183 and 191–193 through concentric circular scanning paths. The scanning movement of the light conductors, in conjunction with the stationary phototransducer 190 and a logic circuit depicted in FIGURE 10 and, in practice, mounted within a suitable compartment 30 in the housing 10, is effective to read the marks on the tag, providing on wire 33** an electrical output to a suitable utilization device such as a cash register, punch, data processor, or the like.

When the scanning head 15 completes at least one revolution and the marks on the tag 20 are properly read, a light 34 mounted on the housing 10 becomes illuminated, providing a visual indication to the operator that the tag reading cycle is completed and that the tag may be removed from the read position in photosensing relationship with the scanning head 15. As the tag 20 is withdrawn from its read position against the window 14, the probe 12 returns to its normal extended position moving its inner end 25 from the bridging relationship with the switch contacts **26*a* and 26*b* thereby interrupting the energization circuit to the motor 16 which stops the rotational movement of the scanning head 15 and extinguishes the lamp 34**.

The tag 20 which is adapted to be read by the reader of this invention is disclosed and claimed in the co-pending application of Paul H. Hamisch, for "Improved Machine Readable Merchandise Tag," Ser. No. 601,683, filed Dec. 14, 1966, the entire disclosure of which is incorporated herein by reference. Briefly, the tag 20 includes the aligner 22 which, as indicated, is in the form of a hole, either blind or through, or a dimple or depression formed in a central portion of a sheet of printing stock constituting the body of the tag. Disposed about the aligner 22 in concentric circular patterns 37, 38 and 39 are timing data in the form of a plurality of photosensible timing bits or marks 42, information bit or mark positions 43, and a photosensible start bit or mark 44, respectively. The information bit or mark positions 43 comprising the intermediate or information ring 38, which number forty-six in all, are divided into nine character groups 51–59 each having five positions *a-e*. The forty-sixth information bit or mark position 60 is left blank separating the first and last character groups 51 and 59, respectively. The start bit 44 is radially aligned with the blank information position 60 and a timing mark 49, and is utilized to provide a signal indicating the start of the information encoded in ring 38. To provide timing signals and thereby synchronize the scanning movement of the head 15 with the operation of the logic circuit of FIGURE 10, forty-six timing bit or marks 42 are provided, the marks 42 being radially aligned with the information bit or mark positions 43 on a one-for-one basis, thereby providing one timing signal for each information bit position 43.

Figure 9:
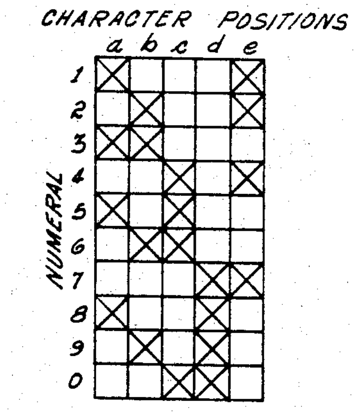
FIGURE 9 is a preferred coding chart for suitable use in encoding a tag.

The bit positions *a–e* of each of the character groups 51–59 can be encoded in accordance with any desired coding scheme. Preferably, however, the character groups 51–59 are encoded using a two-out-of-five parity checking coding scheme, as described in detail in the above referenced copending Hamisch application. Briefly, in the preferred two-out-of-five coding scheme, the information bit positions *a–e* are coded in accordance with the coding chart of FIGURE 9. Specifically, a mark in posi- *a* represents a 1, a mark in position *b* represents a 2, a mark in position *c* represents a 4, a mark in position *d* represents a 7 and a mark in position *e* represents a 0. Encoding one of the character groups 51–59 with a given number from 1 to 10 is accomplished by providing two, and only two, marks in the positions *a–e* of the particular character being encoded such that the sum of the weighted positions in which the marks are placed equals the number to be encoded, with marks being placed in the 0 position *e* when the number to be encoded exactly equals one of the weighted positional values. For example, a 1 is encoded by marking positions *a* and *e*, a 2 is encoded by marking positions *b* and *e*, a 3 is encoded by marking positions *a* and *b*, etc. An exception to this weighted summation coding scheme is that 0 is encoded by marking positions *c* and *d*.

Since there are always two marks, no more and no less, in each encoded character groups 51–49, detection of an omitted or an additional mark in any one of the character groups 51–59, may be achieved by providing suitable circuitry for counting the number of marked positions in a character group. For example, a counter may be provided which generates an error signal should less than or more than two marks occur in any given character groups 51–59. Thus, erroneous tag readings can be avoided.

Figure 4:
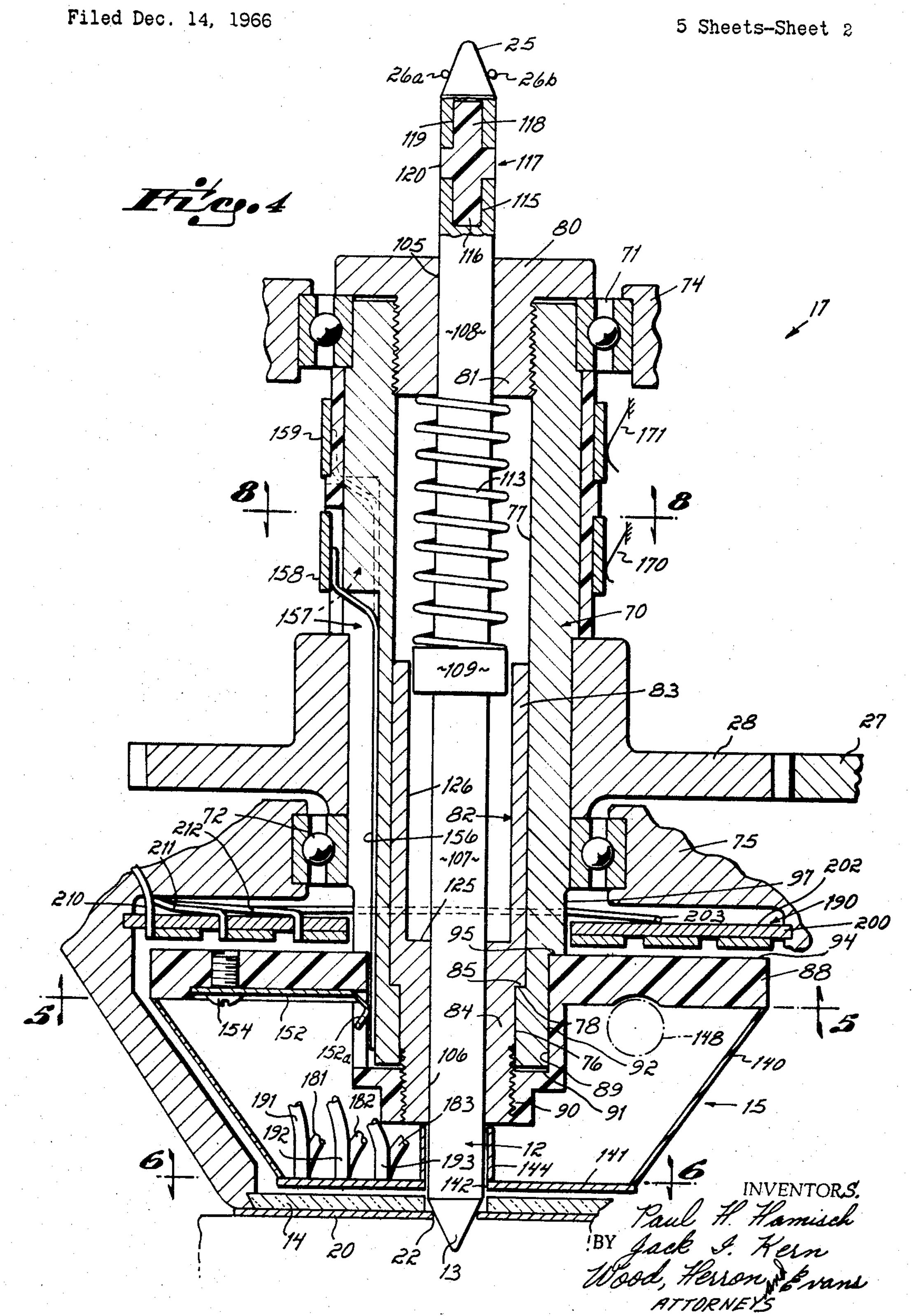
FIGURE 4 is a front elevational view in cross-section of the rotatably mounted scanning assembly.

The scanning assembly 17, as shown more particularly in FIGURES 2 and 4–8, includes a cylindrical housing 70 mounted for rotation about its axis by a pair of spaced ball bearings 71 and 72 secured to the interior housing frame members 74 and 75, respectively. The rotatable cylindrical housing 70 has a lower small diameter bore 76 and an upper large diameter bore 77 separated by a shoulder 78, thereby providing a stepped-bore configuration. A cap 80 having a small diameter externally threaded portion 81 is positioned in the upper end of the large diameter bore 77 and threadedly engages suitable internal threads formed in the bore 77. A sleeve 82 having an upper large outside diameter portion 83 and a lower small outside diameter portion 84 separated by a shoulder 85 is slideably positioned within the housing 70. When the sleeve 82 and housing 70 are positioned as shown in FIGURE 4 the large outside diameter sleeve portion 83 engages the housing bore 77, the small outside diameter sleeve portion 84 engages the housing bore 76, and the sleeve shoulder 85 engages the housing shoulder 78.

A stepped diameter plate 88 having a large diameter internal bore 89 and a small diameter threaded internal bore 90 separated by a shoulder 91 also forms a portion of the scanning assembly 17. The bore 89 of the plate 88 slideably engages an outer cylindrical surface 92 of the housing 70. When the plate 88 is threaded on the small outside diameter portion 84 of the sleeve 82, the sleeve 82 is drawn downwardly until its shoulder 85 abuts the shoulder 78 on the housing 70. Upward axial motion of the plate 88 is limited by engagement of a horizontal top surface 94 of the plate with a shoulder 95 formed by the differing outside diameters of the cylindrical surface 92 and a cylindrical surface 97 of the housing 70. The lower end of the cylindrical housing 70 is foreshortened to provide clearance between the housing 70 and the shoulder 91 thereby permitting the plate 88 to be tightly threaded on the sleeve 82, locking the sleeve 82, housing 70 and plate 88. Co-axial and equal diameter bores 105 and 106 are formed in the cap 80 and sleeve 82, respectively, for slideably mounting and guiding the probe 12.

The probe 12 includes a lower portion 107 having the tip 13 and an upper portion 108 separated by large diameter portion 109. Probe portion 109 functions as a collar for limiting the longitudinal advancement of the probe 12 under the action of a spring 113 positioned about the upper probe portion 108 between the collar portion 109 and the lower surface of the cap 80. The upper portion 108 of the probe 12 has a blind hole 115 formed therein which receives the lower end 116 of an insulative coupling 117 having its other end 118 positioned in a similar blind hole 119 formed in the probe bridging tip 25. The insulative coupling 117 has a large diameter central portion 120 separating the upper and lower blind hole engaging ends 118 and 116 from each other and thereby preventing electrically conductive paths from being established between the bridging tip 25 and the upper probe portion 108.

The insulative coupling 117 fixedly connecting the bridging tip 25 with the remaining portions of the probe 12, as a separate and independent element, can be eliminated although its electrically insulating function cannot be eliminated. Specifically, other arrangements for insulating the protruding probe portion from the electrical contacts **26*a* and 26*b* may be provided, for example, electrical insulation of the bridging tip 25 may be achieved by forming the remainder of the probe, that is, that portion of the probe not including the bridging tip 25**, entirely of insulative material such as plastic or the like.

The probe 12, when normally spring-biased to the lower position, as shown in FIGURE 1, has its collar portion 109 engaged with the internal shoulder 125 formed by a large diameter internal bore 126 and the small diameter internal bore 106 of sleeve 82. The bore 126 is sufficiently large to provide clearance between the collar 109 periphery and the large outside diameter sleeve portion 83. In this normal probe position with the collar portion 109 abutting the shoulder portion 125, the conical tip 13 of the probe is located at its maximum distance from transparent window 14, and the bridging tip 25 is displaced from the switch contacts **26*a* and 26*b* interrupting a suitable energization circuit (not shown) for the motor 16. When the probe 12 is in the position shown in FIGURE 4, which occurs as a consequence of engaging the probe tip 13 with the aligner 22 of the tag 20 and thereafter bringing the photosensible mark bearing surface 40 of the tag against the outside surface of the window 14, the tip 25 is urged between the contacts 26*a* and 26*b* bridging them and thereby completing an energization circuit to the motor 16**.

The contacts **26*a* and 26*b* are preferably formed of flexible spring material. This enables the contacts 26*a* and 26*b* to be bridged by the probe tip 25 throughout a range of axial positions to which the probe 12 may be positioned under varying conditions of use. For example, depending on the diameter of the aligner 22, when the surface 40 of the tag 20 is in contact with the window 14 the bridging tip 25 may be displaced to a number of axial positions. Specifically, if the aligner 22 diameter is small (or large) the tag advances axially on the conical end 13 to a lesser (or greater) extent, causing the bridging tip 25 to advance axially to a lesser (or greater) amount when the tag 20 is in contact with the window 14. By making contacts 26*a* and 26*b* of flexible spring material, the varying displacement of bridging tip 25 under the differing tag aligner diameter conditions encountered in use may be accommodated. That is, varying tip 25 displacements are effective to couple the contacts 26*a* and 26*b*** and complete a motor energization circuit.

The gear 28 is drivingly coupled to the housing 70 in any suitable manner such as by a key (not shown). Meshing with the gear 28 for imparting driving motion to the scanning assembly 17 is the gear 27 which is mounted on the shaft 137 of the motor 16. In operation, when the probe 12 is urged inwardly by positioning of a tag surface 40 against the window 14 causing an energization circuit to be completed to the motor 16 by the bridging of contact **26*a* and 26*b* by the probe tip 25, the motor 16 rotates the scanning assembly 17 about the probe axis via the meshing gears 27 and 28**.

Figures 5, 6, 7, 8:
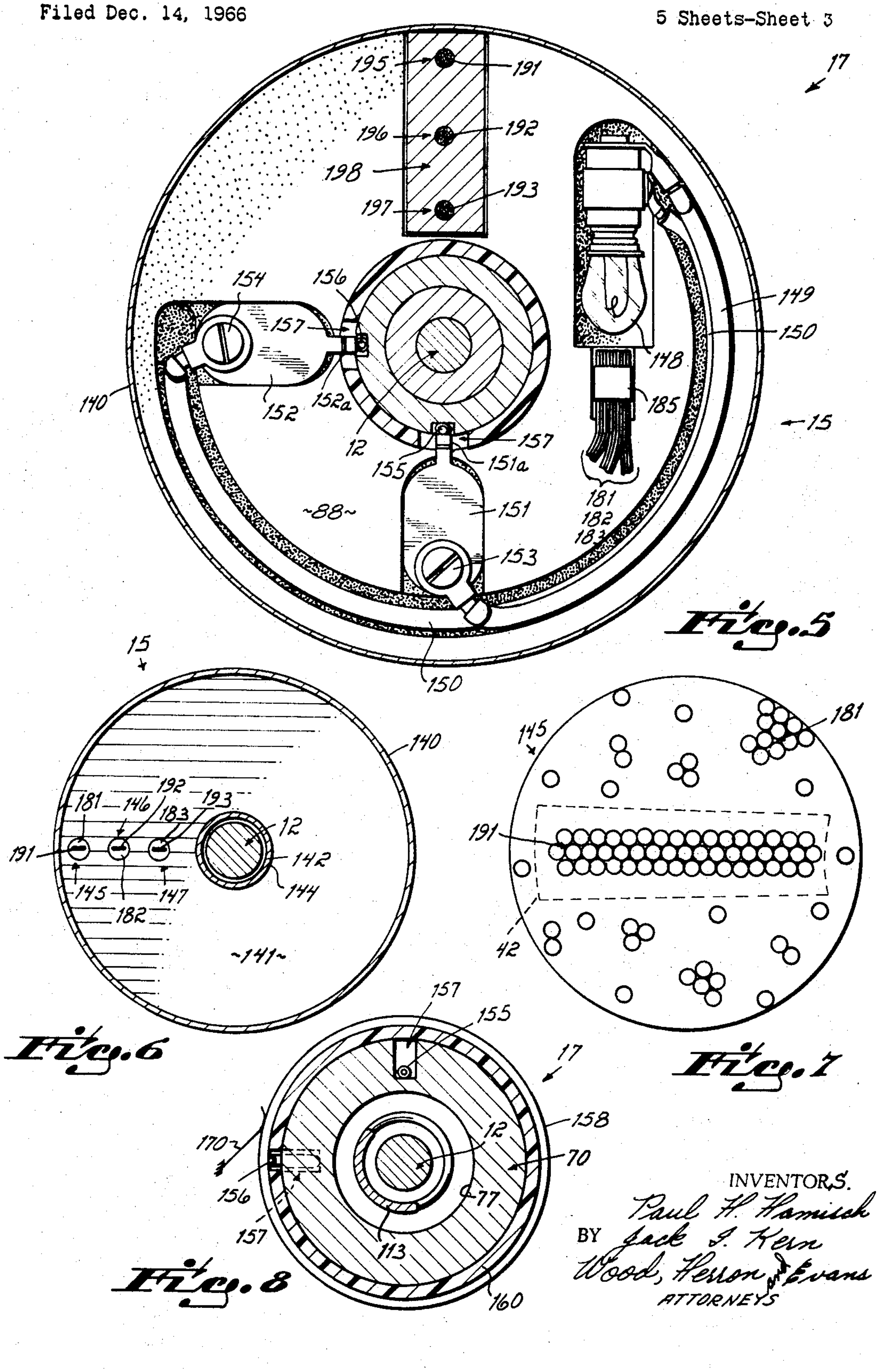
FIGURE 5 is a cross-sectional view taken along line 5—5 of FIGURE 4, showing the illuminating lamp and upper ends of the sensing fiber optic reeds.
FIGURE 6 is a cross-sectional view taken along line 6—6 of FIGURE 4 showing the lower ends of the sensing and illuminating fiber optic reeds.
FIGURE 7 is an enlarged view of the lower ends of one set of sensing and illuminating fiber optic reeds, showing the grouping of the various reeds relative to a photosensible mark.
FIGURE 8 is a cross-sectional view taken along line 8—8 of FIGURE 4, showing details of the scanning assembly.

As best seen in FIGURES 4–8, the scanning head 15 includes an enclosure 140 shaped in the form of a frustum of a cone and having its lower small diameter edge secured to a peripheral edge of an annular plate 141 and its upper large diameter edge secured to a lower peripheral edge of the plate 88. The annular plate 141 has a central probe receiving opening 142 which is surrounded by an upwardly extending cylindrical sleeve 144 secured at its lower end to the edge of the opening 142. Also formed in the annular plate 141 are three radially aligned scanning apertures 145, 146 and 147 as best shown in FIGURES 2 and 6.

The scanning head 15 further includes a lamp 148 suitably mounted to the bottom surface of the plate 88. A pair of electrical leads 149 and 150 connected at one end to the lamp 148 in a conventional manner are, at their other end, connected to fixed contacts 151 and 152, respectively. Both the contacts 151 and 152 and the leads 149 and 150 are suitably positioned within recesses formed in the bottom surface of the plate 88. The contacts 151 and 152 are secured in positions by suitable fasteners 153 and 154, respectively, which pass through apertures in the contacts for threaded engagement with the plate 88. The contacts 151 and 152 have flexible spring ends **151*a* and 152*a*, respectively, which are biased into electrical contact with a pair of wires 155 and 156, respectively. The wires 155 and 156 are positioned within a pair of slots 157 formed in the side of the housing 70 and at their upper ends are electrically connected to rings 158 and 159, respectively, fixedly mounted about the housing 70 and electrically insulated from each other and from the remainder of the scanning assembly 17 by a spacer 160** mounted on the cylindrical housing. The lamp 148 is illuminated via an energization path which includes wires 148 and 149, contacts 151 and 152, wires 155 and 156, rings 158 and 159, and brushes 170 and 171 which are spring biased into electrical contact with the rotating rings 158 and 159, respectively. The brushes 170 and 171 are electrically connected via suitable means to a power supply (not shown).

Light from the lamp 148 is directed through the scanning apertures 145–147 and the transparent window 14 to the photosensible mark bearing surface 40 of a tag 20 properly positioned in a read position against the transparent window 14 by the three groups of light conductors or illuminating fiber optic reeds, 181, 182 and 183. The upper ends of the groups 181–183 of illuminating fiber optic reeds are bunched by a clamp 185 in light receiving proximity to the lamp 148. The lower ends of the groups 181–183 of illuminating fiber optic reeds terminate in the scanning apertures 145, 146 and 147, respectively. In operation, light from the lamp 148 is transmitted to the scanning apertures 145–147 and thence onto rings 37–39, respectively, via the illuminating fiber optic reed groups 181–183, respectively.

Light reflected from the concentric rings 37, 38 and 39 of the tag 20 is transmitted to the stationary annular transducer 190, to be described in detail, via three groups of light conductors or sensing fiber optic reeds 191, 192 and 193, respectively. The groups 191–193 of sensing fiber optic reeds at their upper ends pass through suitable apertures 195, 196 and 197 formed in a block 198 secured to the top plate 88 of the enclosure 140 and are each radially aligned with different annular regions of the transducer 190. The group of sensing fiber optic reeds 191–193 terminate at their lower ends in the scanning apertures 145–147 of the annular disc 141 in alignment with the rings 37–39, respectively.

Referring more particularly to FIGURES 6 and 7, the orientation of the lower ends of the groups of illumination and sensing fiber optic reeds is depicted in detail. Specifically, the lower ends of the sensing fiber optic reeds of each of the groups 191–193 are arranged in three horizontal rows, each now having approximately 15 reeds per row yielding a total of approximately 45 fiber optic reeds per sensing group. The combined width of the three rows of fiber optic reeds of each of the sensing groups 191–193 is preferably less than the circumferential dimension of a photosensible mark in the rings 37, 38 and 39, respectively. The length of the three rows of sensing fiber optic reeds of each of the groups 191, 192 and 193 is preferably less than the radial dimension of the photosensible marks in the rings 37, 38 and 39, respectively. In addition, the lower ends of the sensing fiber optic reeds of groups 191, 192 and 193 are arranged such that the rows of each group are radially disposed. With the lower ends of the group of sensing fiber optic reeds 191–193 dimensioned and positioned as stated, a photosensible mark, if present on the tag 20 opposite the lower ends of a sensing group, will, at one point in the travel of the scanning head 15, completely obscure the three rows of sensing fibers associated with the ring in which the mark is positioned, as shown in FIGURE 7, allowing a high degree of discrimination to be achieved between marks and the unmarked print stock surface.

The lower ends of the illuminating fiber optic reeds of groups 181–183, which also terminate in the apertures 145, 146, and 147, respectively, occupy that space in their respective aperture which surrounds the three rows of sensing reeds as shown clearly in FIGURE 7. Such an arrangement permits uniform illumination of photosensible marks to be achieved at that point in the scanning head 15 travel when a mark completely obscures the lower ends of the sensing fiber optic reeds of a group 191–193.

In operation, as the scanning head 15 rotates about the probe axis 12, light is directed from the lamp 148 through the scanning apertures 145, 146 and 147 and the transparent window 14 to the rings 37, 38 and 39, respectively, formed on the surface 40 of the tag 20, sequentially illuminating successive contiguous segments of the rings 37, 38 and 39, respectively. At the same time, the light reflected from the successively illuminated segments of the rings 37, 38 and 39 is transmitted to different annular regions of the transducer 190 via the transparent window 14, the scanning apertures 145, 146 and 147, respectively, the groups of sensing fiber optic reeds 191, 192 and 193, respectively, and the apertures 195, 196 and 197, respectively.

A preferred form of transducer 190 exhibiting photovoltaic characteristics is shown in FIGURES 1, 4, 11 and 12. This transducer includes an annular substrate 200 having a central opening 201 to accommodate the rotating cylindrical housing 70. The substrate 200 has an upper planar surface 202 to which is electrically connected a common output lead 203 and a lower surface 204 upon which are formed three concentric annular layers 205, 206 and 207 separated by circular grooves 208 and 209. Electric output leads 210, 211 and 212 are connected to the annular layers 205, 206 and 207, respectively. The substrate 200 preferably is fabricated of iron or copper and the layers 205–207 are fabricated preferably of iron selenide or copper oxide, respectively, forming either an iron-selenide or a copper-oxide photovoltaic cell, respectively, of the barrier layer type. The annular layers 205, 206 and 207 are dimensioned and positioned so as to be in continuous light receiving relationship with the groups of sensing fiber optic reeds 191, 192 and 193, respectively.

In operation, when a black mark on the tag 20 is positioned opposite the lower ends of the fiber optic reeds of, for example, the sensing group 191 which terminate in scanning aperture 145, the amount of light transmitted from the lamp 148 to the tag surface 40 by the group of illuminating fiber optic reeds 181 which is reflected by the mark on tag surface 40 to the annular photovoltaic layer 205, 200 via the sensing group of fiber optic reeds 191, is attenuated. The reduced light incident on the annular area 205 as a consequence of the positioning of a mark opposite the scanning aperture 145 reduces the voltage generated by the photovoltaic cell constituted by the cell material 200, 205 lying between the output electric leads 210 and 203. The reduced voltage across the output lead 210 associated with the annular layer 205 and the common lead 203 is transmitted to the logic circuit of the FIGURE 10 and processed in a manner to be described.

On the other hand, should there be no mark opposite, for example, the scanning aperture 145, the amount of light from the lamp 148 transmitted to the tag 20 via the illuminating group of fiber optic reeds 181 and reflected to the annular layer 205 via the sensing group of fiber optic reeds 191 is increased. The increased light incident on the annular layer 205 as a consequence of the absence of a mark opposite the scanning aperture 145 causes the photovoltaic cell constituted by the cell material 200, 205 between the leads 210 and 203 to increase. The increased voltage across the lead 210 associated with the annular layer 205 and the common lead 203 is input to the logic circuit of FIGURE 10 for processing.

In like manner, the presence or absence of a mark opposite scanning apertures 146 and 147 decreases or increases, respectively, the light incident on the photovoltaic cells 206, 200, and 207, 200, respectively, causing decreased or increased voltages to be produced across the lead pairs 211, 203, and 212, 203, respectively.

Figures 11, 12, 13, 14:
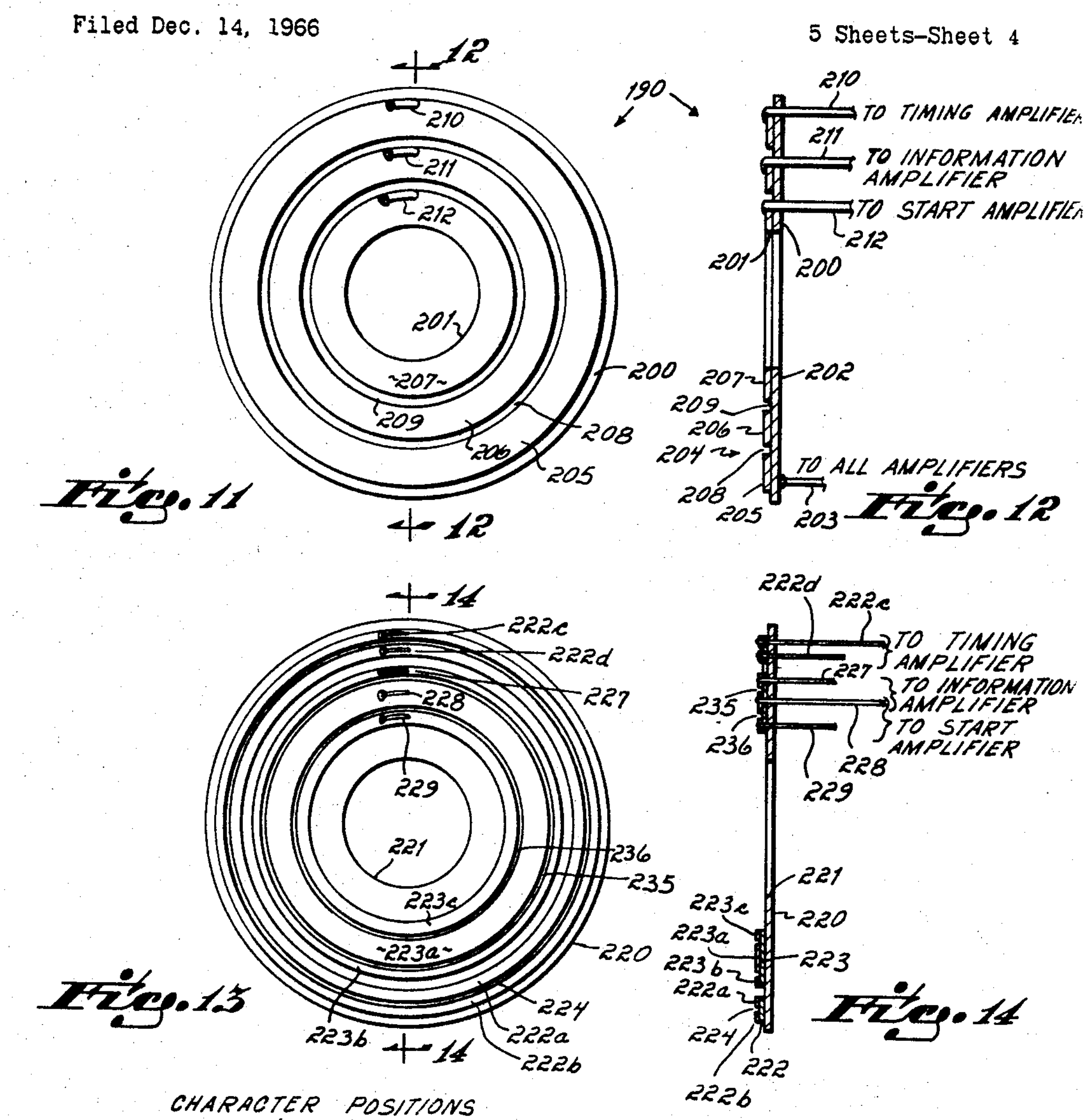
FIGURE 12 is a cross-sectional view of the photovoltaic transducer taken along line 12—12 of FIGURE 11.
FIGURE 13 is a plan view of a photoconductive transducer suitable for use with the reader of this invention.
FIGURE 14 is a cross-sectional view of the photoconductive transducer taken along line 14—14 of FIGURE 13.

Another preferred embodiment of a transducer suitable for use in conjunction with the apparatus of FIGURES 1–9 is shown in detail in FIGURES 13 and 14. This embodiment, which operates on photoconductive principles, includes an annular insulative substrate 220 having a central aperture therein 221 adapted to accommodate the rotating cylindrical housing 70 of the scanning assembly 17. Mounted on the insulating disc 220 is an outer annular layer of photoconductive material 222 and an inner wider layer of photoconductive material 223. The photoconductive layers preferably comprise selenium, although materials forming semiconductor junctions may also be used.

Figure 10:
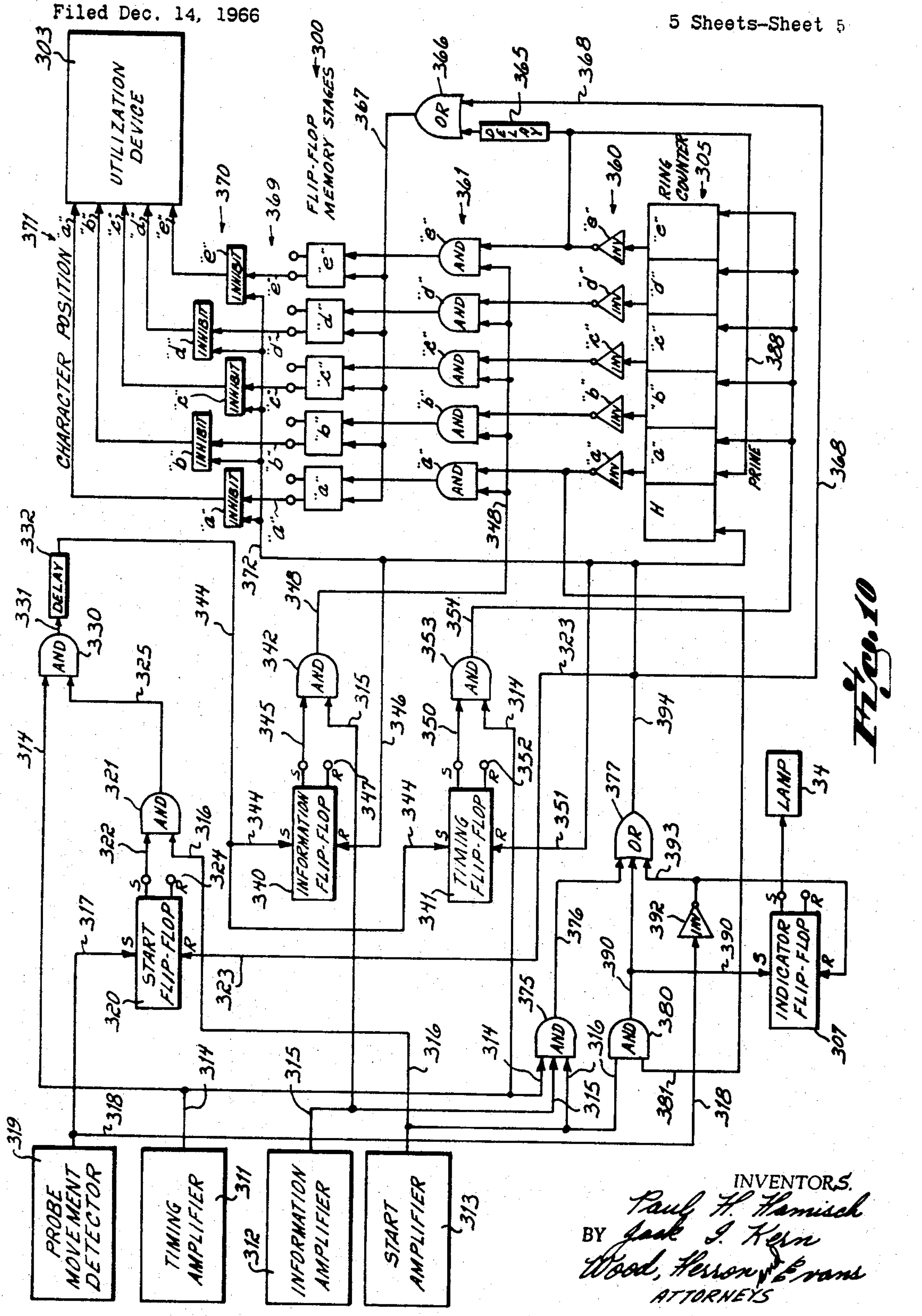
FIGURE 10 is a schematic diagram of a logic circuit suitable for use with the reader of this invention for processing the various signals generated as a consequence of sensing a tag.

A pair of spaced conductive rings 222a and 222b are formed on the photoconductive layer 222 and connected to the logic circuit of FIGURE 10 via leads 222c and 222d, respectively. A space 224 between the conductive rings 222a and 222b is aligned with the upper ends of the group of sensing fiber optic reeds 191 positioned in aperture 195 formed in the block 198 for receiving light transmitted to the outer ring 37 of the tag via the group of illuminating fiber optic reeds 181 and reflected to the transducer via the group of sensing fiber optic reeds 191. A centrally disposed conductive ring 223a flanked on either side by spaced conductive rings 223b and 223c are formed on the surface of the photoconductive layer 223. The conductive rings 223b, 223a and 223c are connectable in use to the logic circuit of FIGURE 10 via leads 227, 228 and 229, respectively. A space 235 between the rings 223a and 223b is aligned opposite the upper ends of the group of sensing fiber optic reeds 192 positioned in the aperture 196 of the block 198 for receiving light transmitted to the ring 38 of the tag via the group of illuminating fiber optic reeds 182 and reflected to the transducer via the group of sensing fiber optic reeds 192. A space 236 between the conductive rings 223a and 223c is aligned opposite the upper ends of the group of sensing fiber optic reeds 193 positioned in the aperture 197 of block 198 for receiving light transmitted to the ring 39 of the tag 20 via the illuminating fiber optic reeds 183 and reflected to the transducer via the sensing fiber optic reeds 193.

In operation if a mark is positioned opposite, for example, the scanning aperture 146, less light is reflected from the tag 20 ring 38 to the photoconductive material aligned with the space 235 via the group of sensing fiber optic reeds 192. The decreased light incident on the photoconductive material behind the space 235 as a consequence of a mark positioned opposite scanning aperture 146 increases the resistance of the material connecting the conductive rings 223a and 223b producing increased resistance between the leads 228 and 227. The increased resistance between the leads 227 and 228 is transmitted to the logic circuit of FIGURE 10. Should there be no mark opposite the scanning aperture 146 an increased amount of light is transmitted via the group of sensing fiber optic reeds 192 to the photoconductive material behind the space 235 causing the resistance of the photoconductive material 223 between the conductive rings 223a and 223b to decrease. The decreased resistance is transmitted to the logic circuit of FIGURE 10 by the leads 227 and 228. In like manner, the presence or absence of a mark on the tag 20 rings 37 and 39 opposite the scanning apertures 145 and 147 decreases or increases, respectively, the light incident on the photoconductive material behind the spaces 224 and 236, respectively, causing increased or decreased resistances to be reflected across the lead pairs 222c and 222d, and 228 and 229, respectively.

A logic circuit adapted to process the various information and timing data signals output from the transducer 190 during a tag reading operation is depicted in FIGURE 10. The logic circuit includes as its principal components a five-position memory circuit 300 in which are stored, during the reading of a particular one of the character groups 51–59 of the information ring 38 of the tag 20, the two information bits of the particular character being read. The memory circuit 300, which preferably comprises a plurality of independent flip-flops the bistable nature of which is used to store signals representing the presence or absence of marks, is readout following the reading of each of the character groups 51–59 and the contents gated to a suitable utilization device 303 such as a card punch, cash register, etc. A six-position ring counter 305 which is responsive to the timing signals generated as a consequence of reading the timing marks 42 of ring 37 is employed to successively enable or condition different ones of the individual storage devices 300a–300e during the reading operation insuring that the presence of marks in information positions 43a and 43e of each of character groups 51–59 are stored in the appropriate storage positions 300a–300e, respectively. The ring counter 305 may be constructed in accordance with well-known techniques and, therefore, it is not necessary to detail its structure herein.

The circuit also includes suitable gating arrangements for initiating storage of the information in the ring 38 of the tag 20 only after the occurrence of appropriate starting conditions such as the depression of the probe 12 as the tag 20 is moved against the window 14, and the detection of the coincidence of both the start bit 44 and the timing bit 49. The circuit further includes suitable arrangements for resetting the ring counter 305 and the memory circuit 300 should certain conditions occur such as the detection of a stray radial line on the tag, the removal of a tag from the reader prior to the completion of the reading cycle, and the completion of a reading cycle. Finally the circuit includes an indicator arrangement 307 which completes an energization circuit to the lamp 34 upon the completion of a reading cycle, thereby indicating to the operator that the tag has been properly read and can now be removed from the read position in contact with the window 14.

Considering the logic circuit of FIGURE 10 in more detail, it is seen to include three amplifiers 311, 312 and 313 responsive, respectively, to the three annular portions of the transducer 190 upon which is incident light from the timing ring 37, the information ring 38, and the ring 39 defined by the start bit 44. More specifically, the timing amplifier 311 is responsive to the output of leads 203 and 210 should the photovoltaic transducer of FIGURES 11 and 12 to be utilized and is responsive to the output across leads 222c and 222d should the photoconductive transducer of FIGURES 13 and 14 be utilized. The information amplifier 312 is responsive to the output across leads 211 and 203 should the transducer of FIGURES 11 and 12 be utilized and to the output across leads 227 and 228 should the transducer of FIGURES 13 and 14 be utilized. The start amplifier 313 is responsive to the output across lines 212 and 203 if the photovoltaic transducer is used and to the output across lines 228 and 229 should the photoconductive transducer be employed. The amplifiers 311, 312 and 313 may be of any desired type suitable for amplifying the relatively small outputs from the transducer 190 to a level sufficient to operate the conventional negative logic blocks to be described. In combination with each of the amplifiers 311, 312 and 313 is suitable circuity for providing a negative going pulse on amplifier output lines 314, 315 and 316 in response to the presence of a photosensible mark opposite the scanning apertures 145, 146 and 147, respectively, thereby facilitating the use of the negative logic to be described.

The circuit also includes a probe movement detector 319 having a pair of input lines 317 and 318 on which are produced, respectively, negative going pulses and positive going pulses when the probe 12 is inserted and withdrawn from the scanning assembly 17 in response to positioning a tag 20 in, and removing a tag from, the read position. The detector 319 which generates the positive going and negative going pulses on lines 318 and 317, respectively, may comprise any suitable apparatus and, for example, may include a capacitor (not shown) in circuit with the motor 16. When the motor 16 is energized, a source of negative potential to which the motor 16 is connected charges the capacitor negatively, producing a negative pulse on line 317. De-energization of the motor causes the capacitor to discharge, producing a positive pulse on line 318.

A start flip-flop or bistable multivibrator 320 and a negative And gate 321 are provided to condition the logic circuit for operation only if the probe 12 has been depressed sufficiently to bridge the marks 26*a* and 26*b*. The flip-flop 320 is responsive to the negative going pulse on line 317 for placing the flip-flop in the set condition, providing a negative output on the set line 322. The flip-flop 320 further includes a second input responsive to a reset signal on line 323, to be described, which functions to place the flip-flop in the reset condition, producing a negative output on the flip-flop reset line 324. The outputs 322 and 324 of the flip-flop 320, like the outputs of other flip-flops to be described, are complementary. Consequently, when the output reset line 324 is positive, the output on the set line 322 is negative and vice versa. The And gate 321 has input thereto both the output from the start flip-flop 320 on line 322 and the output from the start amplifier 313 on line 316. Thus, And gate 321 detects the coincidence of a negative start signal from the start amplifier 313 in response to sensing mark 44 and a negative signal on line 317 indicating the retracted probe condition. And gate 321, like other And gates to be described, is of the negative logic type producing a negative output on line 325 only if both its inputs on lines 322 and 316 are negative.

A negative And gate 330 which is responsive to the output of the And gate 321 on line 325 and the output of the timing amplifier 311 on line 314 is provided to produce on line 331 a negative output in response to the presence of negative signals on lines 314 and 325. Thus, the And gate 330 detects for the coincidence of both a negative timing signal generated in response to sensing mark 49 and a negative start signal generated in response to sensing mark 44. Since a start pulse can only result in an output to And gate 330 if the start gate 320 has been conditioned, the output on line 331 indicative of the presence of both a timing pulse and a start pulse occurs only if, prior to the detection of the start pulse, the probe 12 is depressed bridging the contacts 26*a* and 26*b*.

The output from the And gate 331 is passed through a suitable delay circuit 332 and is thereafter input to both an information flip-flop 340 and a timing flip-flop 341. The delay introduced by circuit 332 delays the conditioning of the timing flip-flop sufficiently to prevent the timing mark 49, which generates a signal concurrently with the generation of the start signal, from advancing the counter 305. The information flip-flop 340 in combination with a negative And gate 342 enables the signal output from the information amplifier 312 which is responsive to information marks 43 in information ring 38 to be gated for subsequent storage in a manner to be described. The information flip-flop 340 includes a first input which is responsive to the output of the delay line on line 344 and which functions to set the flip-flop 340 producing a negative output on set line 345. The information flip-flop 340 is further responsive to a reset input on line 346, to be described, which is operative to reset the flip-flop 340 producing a negative signal on reset line 347. The And gate 342 is responsive to the set terminal 345 and the output of the information amplifier 312 on line 315 and produces a negative output on line 348 upon the coincidence of negative inputs on lines 345 and 315. Thus, an output is produced from the And gate 342 on line 348 if both an information mark 43 in the information ring 38 and a timing mark 42 in the ring 37 are simultaneously detected, providing that at the time of detection of such a mark 43 the probe 12 has been depressed to bridge contacts 26*a* and 26*b* and the And gate 330 has detected the coincidence of both the timing mark 49 in timing ring 37 and the start mark 44 in ring 39.

The timing flip-flop 341 has as one input the output of the delay circuit 332 on line 344 which functions to set the flip-flop 341 producing a negative output on set line 350. The timing flip-flop 341 is further responsive to a reset input on line 351, to be described, for resetting the flip-flop 341 and thereby producing a negative signal on reset line 352. A negative And gate 353 which is responsive to the set line 350 and the output of the timing amplifier 311 on line 314 is provided to gate timing pulses generated by the sensing of marks 42 in timing ring 37 to the ring counter 305 when the flip-flop 341 has been set. Thus, an output is fed by the And gate 353 on line 354 to the ring counter 305 each time a timing mark 42 is detected in the ring 37, providing that the probe 12 has been depressed sufficiently to bridge contacts 26*a* and 26*b* and that the coincidence of the start mark 44 and the timing mark 49 has been detected by the And gate 330.

The ring counter 305 includes a sixth stage 305H which is a home position in which the ring counter is placed each time a stray radial line is detected, the probe is withdrawn disconnecting the contacts 26*a* and 26*b*, or a reading cycle has been completed. The ring counter 305 further includes five stages 305*a*–305*e* corresponding to the five positions *a–e* provided in each of the character groups 51–59 of the information ring 38. The ring counter positions 305*a*–305*e* are each responsive to the output on line 354 of the And gate 353 and, consequently, the ring counter, if the home position 305H, is successively stepped through stages 305*a*–305*e* upon the occurrence of five successive timing signals produced after the probe has been depressed and the start mark 44 and timing mark 49 coincidence detected.

The outputs of the ring counter positions 305*a*–305*e* are passed through inverters 360*a*–360*e*, respectively, to negative And gates 361*a*–361*e*. The output of any given stage of the ring counter 305 is positive if that stage is ON. Consequently, the inversion of the ring counter outputs functions to provide to the negative And gates 361 negative signals when its respective ring counter position is ON. Since only one stage of the ring counter 305, at any one time, is ON, the inverters 360*a*–360*e* function to sequentially enable or condition the And gates 361*a*–361*e* for synchronously gating the information signals output on line 348 from the And gate 342 to the respective memory units or stages 300*a*–300*e*.

The inverted output from the ring counter stage 305*e* is fed back to the first ring counter position 305*a* following the scanning of the fifth information position 43*e* of each of the characters 51–59. This feedback serves to effectively restart the stepping function provided by the inverted outputs of the stages 305*a*–305*e* which in turn re-initiates the conditioning or enabling of the And gates 361*a*–361*e*, thereby readying the first memory stage 300*a* for storage as scanning aperture 146 passes opposite the information mark position 43*a* of the next character group 51–59.

The inverted output of the counter stage 305*e* is also passed through a suitable delay circuit 365 to an Or gate 366 thereby producing an output on lines 367 from the Or gate which serves to reset the individual stages of the memory circuit 300 following the reading of the information positions 43*e* of the various characters 51–59. Thus, upon completion of the reading of the fifth information bit position 43*e* of each of the characters 51–59, the memory stages 300*a*–300*e* of the memory circuit 300, following a suitable delay introduced by circuit 365, are reset, readying them for the subsequent storage of the two information bits of the next successive characters 51–59. The delay introduced by the circuit 365 insures that a suitable readout is provided before the memory 300 is reset. The Or gate 366, like other Or gates to be described, is a negative Or gate, producing a negative output if one or more of its inputs are negative.

The outputs from the stages 300*a*–300*e* of the memory circuit 300, which are present on lines 369*a*–369*e*, are input to inhibit circuits 370*a*–370*e*. The outputs of circuits 370*a*–370*e* in turn are fed on lines 317*a*–371*e* to the suitable utilization device 303, providing the circuits are in their uninhibiting state. The inhibit circuits 370*a*–370*e* may each include transistors which are biased such that they are normally conductive, thereby placing the circuits in their uninhibiting state and enabling the memory outputs on lines 369a–369e to be passed to the utilization device 303, but are rendered non-conductive in response to the presence of a reset signal on line 323, placing the circuits in their inhibiting state and blocking the passage of the memory outputs.

A negative And gate 375 which is responsive to the outputs of the amplifiers 311, 312 and 313 present on lines 314, 315 and 316, respectively, is provided to detect stray radial lines on the tag 20, a stray radial line being productive of simultaneous outputs from all of the amplifiers 311, 312 and 313. The And gate 375 provides on line 376, a negative output to the Or gate 377 should a stray radial line be present on the tag 20, that is, should marks be detected simultaneously in rings 37, 38 and 39. Thus, the And gate 375 provides the error checking capability of determining stray radial lines on the tag such as pencil marks and the like.

A negative And gate 380 which is responsive to the output from the start amplifier 313 on line 316 and the inverted output on line 381 from the first stage 305a of the ring counter 305 is provided to detect the sensing by the reader of the start bit 44 following the completion of the reading cycle. Since the ring counter 305, following the completion of the reading of each of the characters 51–59, is automatically reset to the position 305a by the output on line 388, the coincidence of an output from the stage 305a and from the start amplifier 313 indicates that processing of the photosensitive marks has been occurring and that the start bit 44 presently sensed is reappearing for the second time. Thus, an output from the And gate 380 on line 390 to the Or gate 377 causes an output from the Or gate 377 to be produced on line 394, signaling the end of a complete reading cycle. An inverter 392 responsive to the positive signal on line 318 produces a negative signal on line 393 each time the probe 12 leaves its retracted position to return to the normal extend position. This negative signal is fed to Or gate 377 in turn producing a negative signal on line 394 indicating the removal of a tag 20 from the read position against window 14. The output from the inverter 392 on line 393 is also fed to the flip-flop 307 for resetting the flip-flop and extinguishing the lamp 34 should the lamp 34 have been illuminated by the presence of an input on line 390 indicating the completion of a reading cycle.

The OR gate 377, as indicated, produces an output on line 394 when there is an input on either one of its input lines 376, 390 and 393. The Or gate output on line 394 is fed to the ring counter stage 305H to place the ring counter in the home position. The output from Or gate 377 on line 394 is also fed via line 368 to the Or gate 366 for producing a reset signal on line 367 to thereby reset the various stages 300a–300e of the memory circuit. The output on line 394 is further fed to the flip-flops 320, 340 and 341 via lines 323, 346 and 351, respectively, for the purpose of resetting each of them and thereby preventing the gating of start, information, and timing signals from the amplifiers 313, 312 and 311, respectively, to the remaining portions of the circuit. Finally, the output on line 394 from the Or gate 377 is fed to the inhibit circuits via line 372, 370a–370e for placing then in the non-conducting condition so as to prevent a readout to the utilization device 303 of the contents of the memory circuit stages 300a–300e.

In the following description of the operation of the tag reader, which includes a description of the operation of the logic circuit of FIGURE 10, it is assumed a tag is being read having the configuration of photosensible marks of tag 20 in FIGURE 3. It is also assumed that flip-flops 320, 340, 341 and 307 and memory stages 300a–300e are reset, and that the ring counter is in the home position 305H, all of which are a necessary consequence of having allowed the probe 12 to return to its normal position following the reading of the previous tag.

In operation, the user grasps the housing 10 of the reader and engages the conical probe tip 13 with the tag aligner 22. Having so engaged the conical probe tip 13 and the aligner 22, the tag 20 is urged toward the transparent window 14 bringing the photosensible mark bearing surface 40 of the tag into the read position, that is, in contact with the outer surface of the transparent window 14. As the tag 20 is being brought toward the window 14 the probe 12 is being simultaneously driven axially into the scanning assembly 17 of the reader. When the tag surface 40 has been advanced to a point where it is in contact with the exterior surface of the window 14 the bridging tip 25 of the probe has been advanced to where it bridges the contacts 26a and 26b, completing an energization circuit to the motor 16.

At this point, it is noted that no precaution need be taken in aligning the tag 20 relative to the reader except that of engaging the conical probe tip 13 with the aligner 22. It is not necessary that the scanning apertures 145, 146 and 147 in the disc 141 which circumscribe the lower ends of the grouped illuminating and sensing fiber optic reeds 181 and 191, 182 and 192, 183 and 193, respectively, be positioned with any particular angular orientation with respect to the timing, information, and start bit rings 37, 38 and 39, respectively. It is also noted at this point that engagement of the probe tip 13 and the aligner 22 functions to automatically align scanning apertures 145, 146 and 147 with the timing, information, and start bit rings 37, 38 and 39, respectively. Such alignment insures that as the scanning head 15 rotates the photosensible marks 42, 43 and 44 in the timing, information and start bit rings 37, 38 and 39, respectively, are scanned by their associated groups of illumination and sensing fiber optic reeds 181 and 191, 182 and 192, 183 and 193, respectively.

The bridging of contacts 26a and 26b in response to the movement of the probe end 25 into the reader, in addition to starting the motor 16, is also effective to generate a negative pulse on line 317 which sets the flip-flop 320, providing a negative signal on output line 322. The negative signal on line 322 conditions or enables the And gate 321 for gating the start signal generated as a consequence of sensing start bit 44.

The alignment of the timing, information and start rings 37, 38 and 39 with the scanning apertures 145, 146 and 147, respectively, by engaging the aligner 22 and probe tip 13 and urging the tag into the read position, in addition to enabling the And gate 321, is also effective to start the motor 16. Angular movement of the motor 16 is transmitted to the scanning head 15 via the shaft 137, gears 27 and 28, cylindrical housing 70, sleeve 82 and plate 88. The scanning head 15, therefore, begins rotation causing the scanning apertures 145, 146 and 147 to sweep through their respective circular scanning paths aligned with the timing, information, and start rings 37, 38 and 39.

Assuming that when the motor 16 starts rotating the the apertures 147, 146 and 145 are not angularly aligned with the start bit 44, the blank bit position 60 and the timing mark 49 separating the character groups 51–59, respectively, the successive movement of timing marks 42 opposite the scanning apertures 145 which is productive of successive negative timing signals output from the timing amplifier 311 on line 314 is ineffective to operate the logic circuit of FIGURE 10. Specifically, the timing signals on line 314 are not gated by the And gate 353 since the And gate 353 is not conditioned by an output on line 350 from the start flip-flop 341, the flip-flop 341 not having been set by a delayed output on line 344 from And gate 330 which as generated by the detection of the start bit 44 and the timing bit 49. In addition, the information signals from the information amplifier 312 on line 315 which are fed to the And gate 342 are not gated by this And gate inasmuch as the information flip-flop 340 has not been set by a delayed output from the And gate 330 which as indicated, occurs as a consequence of detecting the start bit 49 on tag 20.

When the scanning head 15 has rotated sufficiently to align the scanning apertures 145, 146 and 147 with the timing bit 49, the space 60 of the information ring 38, and the start bit 44, respectively, the circuit becomes operative to process the scanning marks thereby initiating the beginning of the reading cycle. Specifically, the presence of the marks 49 and 44 opposite the scanning apertures 145 and 147, respectively, cause signals to be output from the amplifiers 311 and 313. The output from the amplifier 311 on line 314 and the output from the amplifier 313 on line 316 are input to the And gate 330 producing an output therefrom on line 331. The output on amplifier 311 is directly coupled to the And gate 330 while the output on line 316 is gated through the And gate 321 which has been conditioned by the setting of flip-flop 320 in response to the movement of the probe 12 into the housing 10. The output of And gate 331 in response to the presence of the inputs on lines 314 and 325 is passed through the delay circuit 332 and thence input to the information flip-flop 340 setting the flip-flop and thereby producing a negative output on line 345. The output on line 345 is input to the And gate 342 conditioning this gate for subsequent gating of information signals generated by marks 43 in the information ring 38 and manifested in the form of electrical signals output on line 315 from information amplifier 312.

The delayed output of And gate 330 appearing on line 344 is also input to the timing flip-flop 341 setting this flip-flop and thereby producing a negative signal on outpipe line 350. This signal is effective to enable or condition And gate 353 for gating timing signals which subsequently appear on line 314 and which are generated by the successive passing of timing marks 42 forming part of the timing ring 37 opposite the scanning aperture 145.

The first timing signal output from the And gate 353 on line 354 is input to the ring counter stages **305*a*–305*e* for advancing the ring counter 305 from the home position 305H to the first position 305*a*. It will be remembered that the ring counter 305 is placed in the home position 305H each time a complete reading cycle has been completed as well as each time the probe is withdrawn from the housing 10 or the radial line detector 390 detects a stray radial line on the tag. Consequently, the first timing signal gated by the AND gate 353 necessarily advances the counter from the home position 305H to the first position 305*a*. With the ring counter position 305*a* in the "on" condition, a positive signal is input to the inverter 360*a* producing a negative output which is fed into the AND gate 361*a*. The negative output conditions or enables the And gate 361*a* for gating the signal generated by information amplifier 312 on line 315 corresponding to an infomation mark in character position 51*a***, should one be present.

As the scanning head 15 continues rotating bringing the scanning apertures 145, 146 and 147 into alignment with the radial line passing through the character position **51*a* and the timing mark associated therewith, a timing signal is generated by the outer annular ring of the transducer 190 which is input to the amplifier 311 producing an output on line 314. The output on line 314 is gated through conditioned And gate 353 to the ring counter 305 where it is effective to step the counter from the home position 305H to position 305*a*, enabling the And gate 361*a* in the manner indicated earlier. In addition, the presence of an information bit or mark 43 in information bit position 51*a* causes the intermediate ring of the transducer 190 to generate an output which is input to the amplifier 312 producing an output on line 315. The information signal on line 315 is gated through the conditioned And gate 342 to all of the And gates 361*a*–361*e*. However, since only And gate 361*a* is conditioned by the ring counter 305, only And gate 361*a* passes the signal on line 348 to the memory circuit 300. Specifically, the And gate 361*a* gates the signal on line 348 to the first memory stage 300*a* where it is stored by switching the condition of the flip-flop comprising this memory stage. The switched condition of flip-flop memory stage 300*a* is then passed by the uninhibited circuit 370*a* to the utilization device 303 on line 371*a***, where it can operate a punch, cash register, or the like.

Since the circumferential dimension of the information mark in position **51*a* extends, in the direction of scanning, beyond the circumferential dimension of the timing mark 42 with which it is associated, the information signal output from the amplifier 312 on line 315 generated as a consequence of sensing the mark 43 in position 51*a* exceeds in duration the timing signal output from amplifier 311 on line 314 generated as a consequence of sensing the timing mark 42 associated with the mark in position 51*a*. Consequently, timing marks can advance the counter 305 and condition And gates 361 for storage of information marks 43** with which they are radially aligned.

Further rotation of the scanning head bringing apertures 145, 146 and 147 into alignment with the radial line passing through the information bit position **51*b* is effective to generate a timing signal on line 314. The timing signal on line 314 is gated through the conditioned And gate 353 to the ring counter 305 advancing the ring counter one position. The output from the ring counter storage position 305*b* is now conditioning And gate 361*b* for storage of an information signal in memory unit 300*b*, should there be a mark in character position 51*b*. Since no information bit appears in the character position 51*b*, no signal is gated from the information amplifier output line 315 through the And gate 361*b* to be stored in the memory unit 300*b*. Hence, no switching of memory unit 300*b* results and there is no output to the utilization device 303 on line 371*b***.

Continued rotation of the scanning head 15 brings the scanning apertures 145, 146 and 147 into alignment with the timing mark corresponding to information positions **51*c* and 51*d*, successively producing two timing signals on line 314. The two successive timing signals output from the timing amplifier 311 on line 314 are gated through the conditioned And gate 353, advancing the counter from position 305*b* to position 305*c* and thence to position 305*d*, successively conditioning And gates 300*c* and 300*d* for the storage of information marks in character positions 51*c* and 51*d*, respectively, should any exist. However, no such marks exist and, therefore, no storage results and no outputs are input to the utilization device 303 on lines 371*c* and 371*d***.

Further rotation of scanning head 15 aligns the apertures 145, 146 and 147 with the information mark position **51*e*. The timing mark 42 for this information mark position generates an output on line 314 which is gated through conditioned And gate 353 to the counter 305, advancing the counter to the position 305*e*. With the counter in position 305*e*, an output is present on inverter 360*e* conditioning And gate 361*e* for storage in memory unit 300*e* of an information mark in position 53*e*, should one exist. Since an information mark is present in the position 51*e*, it is sensed, producing an output from the information amplifier 312 on line 315. The signal on line 315 is gated through the conditioned And gate 342 producing on line 348 an output which is fed to all of the And gates 361*a*–361*e*. Since And gate 361*e* is the only And gate which is conditioned by the counter 305, the information signal on line 348 is gated only to the fifth storage 300*e* where it is stored by switching the flip-flop of this storage unit, producing an output on line 369*e*. The signal on line 369*e* is fed through the uninhibited circuit 370*e* to the utilization device 303 via line 371*e*. The memory stages 300*a* and 300*e*** are now both switched representing the storage of the numeral 1 in the two-out-of-five code described previously.

The inverted output of counter stage **305*e* is also fed back to the first counter stage 305***a* via line 388 for priming the first stage so that the next timing signal present on line 314, which corresponds to information bit position 52*a*, places the counter in the first stage 305*a*. The output from the fifth counter position 305*e*, which is present until the sensing of the timing mark aligned with information position 52*a*, is, after a suitable delay, input to the Or gate 366. Or gate 366 in turn produces an output on line 367 which is effective to reset the memory 300, particularly flip-flop stages 300*a* and 300*e*, to the reset condition indicative of the absence of stored marks.

As the scanning head 15 continues rotating, bringing the scanning apertures 145, 146 and 147 into angular alignment with the information bit position 52*a*, a timing signal is generated on line 314 by the timing amplifier 311 which is gated through the conditioned And gate 353 to the ring counter 305, advancing the counter from position 305*e* to the position 305*a*, the position 305*a* having already been primed by the inverted output from the position 305*e*. With the ring counter in the position 305*a*, the And gate 361*a* is enabled. However, since no information bit is present in position 52*a* no information signal is present on line 315 to be gated through the gates 342 and 361*a* and thereby switch the flip-flop memory stage 300*a*. Consequently, no information is stored in the flip-flop memory stage 300*a*.

Continued rotation of the scanning head 15 brings the apertures 145, 146 and 147 into alignment with the character position 52*b*. This produces a timing signal on line 314 which is gated through the gate 353 to the counter for advancing the counter to position 305*b* and conditioning the gate 361*b*. The presence of an information mark in character position 52*b* generates a signal on line 315 which is gated through And gate 342 to all of the And gates 361*a*–361*e*. Since And gate 361*b* is the only And gate conditioned, the information signal on line 348 is gated only to the memory flip-flop stage 300*b* where it is stored. The switched flip-flop 300*b* produces an output which is passed through the uninhibited circuit 370*b* and to the utilization device 303 via line 371*b*.

Successive rotation of the scanning head 15 past the information bit positions 52*c* and 52*d* produces two successive timing signals on line 314 which are gated through the conditioned And gate 353 to the counter 305 for advancing the counter from position 305*b* to position 305*c* and thence from position 305*c* to 305*d*. Since no information marks are present in bit positions 52*c* and 52*d*, no signals are generated on line 315 for storage in memory stages 300*c* and 300*d*.

Further rotation of the scanning head 15, angularly aligning apertures 145–147 with the information position 52*e* produces another timing signal on line 314 which is gated through the And gate 353 to the counter 305, advancing the counter to the position 305*e* and enabling the And gate 361*e*. Since an information bit 43 appears in position 52*e* an information signal is generated on line 315 which is gated through the conditioned And gate 342 producing an output on line 348 which is, in turn, gated through the conditioned And gate 361*e* switching the memory flip-flop stage 300*e* and producing an output through the uninhibited circuit 370*e* on line 371*e* to the utilization device 303. The memory stages 300*b* and 300*e* are now switched representing the storage of the numeral 2 in the two-out-of-five code described previously.

The switching of the counter 305 to the position 305*e* is, after a suitable delay introduced by delay circuit 305, effective to reset the flip-flop stages of the memory 300 via the signal on line 367 generated by the delayed and inverted output of counter position 305*e* which is fed to Or gate 366. In addition, the output from the counter position 305*e* on line 388 is effective to prime the counter position 305*a* so that the next timing signal on line 354 places the counter in the position 305*a*.

As the scanning head 15 continues to rotate, the timing marks 42 in the timing ring 37 are successively sensed, producing timing signals on line 314 which are gated through the And gate 353, stepping the ring counter 305. Every fifth timing bit, that is, the timing bit aligned with the bit position *e* of the characters 53–59, is effective, following a delay introduced by circuit 365, to generate a reset signal for resetting the memory flip-flop stages 300*a*—300*e*, and priming counter stage 305*a*. For example, the five timing bits 42 aligned with the bit positions 53*a*–53*e* successively condition the And gates 361*a*–361*e*, respectively, to gate to the memory stages 300*a*–300*e*, respectively, information signals appearing on line 315 which are produced by the presence of bits in the character positions 53*a*–53*e*, respectively, of the information ring 38. The fifth timing bit in position 53*e* resets, after a delay, the memory 300, as well as primes counter position 305*a*. The successive scanning of the character groups 53–59, therefore, results in the successive storing of signals in memory stage flip-flops 300*a* and 300*b*, 300*c* and 300*e*, 300*a* and 300*c*, 300*b* and 300*c*, 300*d* and 300*e*, 300*a* and 300*d*, 300*b* and 300*d*, corresponding to the numerals 3, 4, 5, 6, 7, 8, and 9 encoded in a two-out-of-five code in the character groups 53–59, respectively. The memory flip-flop stages 300 are successively reset shortly after the sensing of the timing mark corresponding to the *e* position of each of the character groups 53–59, effectively successively erasing from the memory 300 the stored pairs of information bits of each character.

When the scanning head has rotated further to a point where the scanning apertures 145, 146 and 147 are again aligned with the bit 49, the space 60, and the start bit 44, respectively, the counter is in the position 305*a* providing an output to the And gate 380. This input to the And gate 380 on line 381 in conjunction with the start signal on line 316 is effective to produce an output from the And gate 380 on line 390 which is input to the Or gate 377. Or gate 377 in turn produces an output or reset signal on line 394. The reset signal on line 394 is fed to Or gate 366, generating an output on line 367 which functions to reset the memory flip-flop stages 300*a*–300*e*. The reset signal on line 394 is also input to home stage 305H of the counter, returning the ring counter to the home position. The signal on line 394 further actuates the inhibit circuits 370 preventing a readout from the memory 300, and resets the start flip-flop 320, the information flip-flop 340, and the timing flip-flop 341. With the start flip-flop 320 reset and the And circuit 321 disabled, additional start signals from amplifier 313 on line 316 produced as a consequence of repeated sensing of the start mark 44 are ineffective. With the information flip-flop 340 reset, information signals on line 315 generated as a result of further sensing of marks 43 in the information ring 38 are blocked by the disabled And gate 342. With the timing flip-flop 341 reset, timing signals on line 314 generated by continued sensing of timing marks 42 in the timing ring 37 are blocked by the disabled And gate 353. Thus, although additional signals may appear on one or more of the lines 314, 315 and 316, as a consequence of sensing marks in rings 37, 38 and 39, respectively, the flip-flops 320, 340 and 341 in conjunction with And gates 321, 342 and 353, respectively, prevent such additional signals from operating the logic circuit, that is, from being stored in the memory 300 and gated to the utilization device 303.

The output on line 390 from the And gate 380 which occurs as a consequence of sensing the start bit 44 after having completed a tag reading cycle, in addition to resetting the memory 300, counter 305, inhibit circuits 370 and flip-flops 320, 340 and 341, is also effective to set the flip-flop 307, illuminating the lamp 34 and thereby providing a visual indication to the operator that the tag has been properly read. The lamp 34 is extinguished when the tag is removed from the read position against the window 14, allowing the probe tip 25 to decouple the contacts 26_a_ and 26_b_, thereby de-energizing the motor 16 and generating a positive pulse on line 318 which, after inversion by inverter 392, resets the flip-flop 307.

In the course of scanning the tag should a radial line, such as a stray pencil mark, pass the scanning apertures 145, 146 and 147, signals are simultaneously generated on lines 314, 315 and 316 which are input to the And gate 375. The And gate 375 in response thereto provides an output on line 376 which is input to the Or gate 377 for resetting the counter to the home position 305H, resetting the memory 300, the flip-flop 320, 340 and 341, and the inhibit circuits 370. With these various circuit components reset in response to a stray radial line, further readouts from the memory 300 are prevented. In addition, the lamp 34 does not become illuminated, indicating to the operator that a proper and complete reading of an entire tag has not occurred. Thus, the operator is apprised that there is an error.

Should the tag be withdrawn from the read position in contact with the transparent window 14 prior to completion of a tag reading cycle, a positive signal is generated on line 318 in response to decoupling of the contacts 26_a_ and 26_b_ produced by the action of the probe bridging tip 25. The positive signal on line 318, after inversion by the inverter 392, provides an input to the Or gate 377. The Or gate 377 in turn provides an output on line 394 which is effective to reset the ring counter to the home position 305H, reset the memory 300 and inhibit circuits 370, and reset the flip-flops 320, 340 and 341. With these various circuit components reset, further readout from the memory is prevented. In addition, the lamp 34 does not become illuminated and the operator again is apprised of the fact that an error has occurred in the reading operation.

Although the present invention has been described with reference to a preferred embodiment thereof, it should be understood that numerous other modifications and embodiments can be devised by those skilled in the art that will fall within the spirit and scope of the principles of this invention. For example, it is contemplated that optically contrasting marking schemes can be employed to encode the tag other than that described herein. It is possible to use light colored marks on an optically contrasting dark colored print stock as opposed to the black marks on the light colored tag of FIGURE 3.

It is also possible, if desired, to provide the reader with means for placing a mark on the tag when it is read, thereby preventing a potential thief from stealing merchandise and later attempting to return it for a refund. With such means, only those items which were in fact purchased would bear the prescribed mark. Consequently, any attempt to return, for refund, a stolen item which was never actually read and, hence never actually purchased, would be immediately detected by the store clerk since it would lack the prescribed mark indicating that it previously had been read.

It is further contemplated that the reader of this invention may be utilized to read tags having more than one information ring. For example, it is within the scope of this invention to provide a reader which can read an eighteen character, two ring tag of the type disclosed in the above-referenced Hamisch copending application. This can be accomplished by providing the scanning head with an additional or fourth set of illuminating and sensing light conductors. The added illuminating light conductor transmits light from the lamp to the second information ring, while the added sensing light conductor transmits reflected light from the second information ring to a fourth annular transducer provided for this purpose. To process the signals from the fourth transducer, which would be concentric with the three shown in the disclosed embodiment, a fourth amplifier is added to the logic circuit. This amplifier cooperates with a second memory unit to store the marks of characters of the second information ring in the same manner as the flip-flop memory unit stores the marks of the characters of the information ring in the disclosed embodiment.

What is claimed is:

1. Apparatus for reading a tag having photosensible mark receiving positions arranged in concentric circular patterns centered about an aligner formed in a tag, said apparatus comprising:

a support, a probe mounted on said support and engageable with said aligner for properly positioning a tag in a read position, a scanning head mounted to said support for rotation coaxial with said probe, a light source fixed to said scanning head, a plurality of illuminating light conductors mounted for movement with said scanning head, said illuminating light conductors each having first ends terminating at a common point in light receiving relationship to said source, and second ends terminating at radially disparate points defining separate mark sensing stations for illuminating said circular patterns of a tag properly positioned in said read position, and a plurality of sensing light conductors mounted for movement with said scanning head, said sensing light conductors each having first ends terminating at different ones of said mark sensing stations, and second ends terminating at independent transducer irradiating stations for independently transmitting reflected light from their respective radially disparate sensing stations to their respective transducer stations.

2. The apparatus of claim 1 wherein said second ends of said illuminating light conductors and said first ends of said sensing light conductors terminate in radially aligned sensing stations.

3. The apparatus of claim 1 further including a plurality of annular photo-transducers fixedly mounted to said support coaxially relative to said probe, said transducers having outputs for providing electrical signals in response to light from said sensing light conductors.

4. The apparatus of claim 3 further comprising drive means for rotating said scanning head, said drive means being operative when said tag is properly positioned in said read position to cause simultaneous irradiation by said light source of, and transmission to said photo-transducers of light reflected from, said photosensible mark receiving positions of said concentric tag rings as said positions sequentially move relative to said sensing stations, thereby producing at said photo-transducer outputs sequences of electrical signals correlated to the patterns of photosensible marks in said concentric circular patterns.

5. The apparatus of claim 1 wherein said illuminating and sensing light conductors comprise bundles of illuminating and sensing fiber optic reeds respectively, and wherein the first ends of said sensing reeds are bundled in groups having a cross-sectional area less than the area of a photosensible mark for providing light inputs to associated transducers which afford reliable discrimination of photosensible marks.

6. The apparatus of claim 5 wherein the second ends of said illuminating fiber optic reeds are bundled in groups surrounding said groups of sensing reeds for providing maximum illumination of photosensible marks when said groups of sensing fiber optic reeds are aligned with said photosensible marks.

7. The apparatus of claim 4 wherein said probe is mounted for inward axial motion in response to movement of said tag into said read position, and further comprising a switch in circuit arrangement with said drive means, said switch being actuable by said inward movement of said probe for initiating rotation of said scanning head when a tag is moved into said read position.

8. The apparatus of claim 3 wherein said photo-transducers each comprise an annular disc having a layer of material formed thereon, said disc and layer in combination forming an annular photovoltaic cell for providing across a pair of output leads each connected to different ones of said layer and disc a voltage correlated to the light transmitted from said tag to said transducer via said sensing light conductor.

9. The apparatus of claim 3 wherein said photo-transducer comprises an annular insulative substrate having an annular layer of photoconductive material for providing across a pair of leads connected to said layer at spaced radii a resistance correlated to the light transmitted from said tag to said transducer via said sensing light conductor.

10. The apparatus of claim 3 wherein said scanning head includes an elongated tubular member passing through said annular photo-transducer and having a pair of conductive rings thereabout electrically connected to said light source, said tubular member being rotatably mounted to said support for rotation coaxial with and encircling said probe, thereby providing a compact reading apparatus having a rotating light source energizable from a stationary power source.

11. A tag reading system comprising:

a sheet of printing stock having a print receptive surface thereon, a first plurality of information mark positions, said positions being located on said print receptive surface of said tag and adapted to receive photosensible information marks, a plurality of photosensible timing marks imprinted on and optically contrasting with said print receptive surface of said tag, said timing marks being equal in number to the number of said information mark positions and arranged in a circular pattern concentric with said information mark pattern for synchronously generating timing signals during the scanning of said information positions, an aligner located at the center of said circular patterns, a support, a probe mounted on said support and engageable with said aligner for properly positioning a tag in a read position, at least two annular photo-transducers fixedly mounted to said support coaxially relative to said probe and having outputs for providing electrical signals in response to light incident on said photo-transducers, a scanning head mounted to said support for rotation coaxial with said annular photo-transducers and probe, a light source fixedly mounted to said scanning head, first and second tag illuminating light conductors fixed to said scanning head, said first and second illuminating light conductors each having a first end in light receiving relationship with said light source and a second end in light irradiating relationship to, respectively, said circularly arranged photosensible timing marks and said information mark positions of a tag properly positioned in said read position for transmitting a beam of light from said source to said timing marks and information mark positions, first and second tag sensing light conductors fixed to said scanning head, said first and second conductors each having a first end in light irradiating relationship to different ones of said annular photo-transducers and a second end adjacent different ones of said second ends of said illuminating light conductors and in light receiving relationship to, respectively, said photosensible timing marks and said information mark positions of said tag for transmitting light reflected from said timing marks and information marks to said photo-transducers, and drive means for rotating said scanning head, said drive means being operative when said tag is properly positioned in a read position to cause simultaneous irradiation by said light source of, and transmission to said respective photo-transducers of light reflected from, said photosensible timing and information marks of said tag as said marks sequentially move relative to said second ends of said light conductors, thereby producing at said photo-transducer outputs a sequence of electrical signals correlated to the pattern of photosensible marks in said timing and information circles.

12. The system of claim 11 wherein said illuminating and sensing light conductors each comprise a bundle of illuminating and sensing fiber optic reeds respectively, and wherein the second ends of said sensing reeds are bundled in a group having a cross-sectional area less than the area of a photosensible mark for providing light inputs to said transducer which afford reliable discrimination of photosensible marks.

13. The system of claim 12 wherein the second ends of each of said bundle of illuminating fiber optic reeds are bundled in a group surrounding its respective group of sensing reeds for providing maximum illumination of a photosensible mark when said group of sensing fiber optic reeds is aligned with a photosensible mark.

14. Apparatus for reading a tag having photosensible mark receiving positions arranged in a circular pattern centered about an aligner formed in the tag, said apparatus comprising:

a support, a probe mounted on said support and engageable with said aligner for properly positioning a tag in a read position, an annular photo-transducer fixedly mounted to said support coaxially relative to said probe and having an output for providing electrical signals in response to light incident on said photo-transducer, a scanning head mounted to said support for rotation coaxial with said annular photo-transducer and probe, a light source fixedly mounted to said scanning head, a tag illuminating light conductor fixed to said scanning head, said illuminating light conductor having a first end in light receiving relationship with said light source and a second end in light irradiating relationship to the circularly arranged photosensible mark receiving positions of a tag properly positioned in said read position for transmitting a beam of light from said source to said tag, a tag sensing light conductor fixed to said scanning head, said sensing conductor having a first end in light irradiating relationship to said annular photo-transducer and a second end adjacent said second end of said illuminating light conductor and in light receiving relationship with said photosensible mark receiving positions of said tag for transmitting light reflected from said tag to said photo-transducer, and drive means for rotating said scanning head, said drive means being operative when said tag is properly positioned in said read position to cause simultaneous irradiation by said light source of, and transmission to said photo-transducer of light reflected from, said photosensible mark receiving positions of said tag as said positions sequentially move relative to said second ends of said light conductors, thereby producing at said photo-transducer output a sequence of electrical signals correlated to the pattern of photosensible marks in said circular patterns.

15. Apparatus for reading photo-sensible information arranged in a pattern on an information bearing surface comprising:

a support;

a scanning head mounted to said support for movement in scanning relation to said pattern when said information bearing surface is properly positioned in a read position;

a light source fixed to said scanning head;

an illuminating light conductor mounted for movement with said scanning head, said illuminating light conductor having a first end terminating in light receiving relationship to said source and a second end terminating at a mark sensing station overlying said pattern of an information bearing surface properly located at said read station for illuminating said pattern; and a sensing light conductor mounted for movement with said scanning head and having a first end terminating at said mark sensing station and a second end terminating at a transducer irradiating station remote from said mark sensing station for transmitting reflected light from said sensing station to said transducer irradiating station.

16. The apparatus of claim 15 wherein said information pattern is circular and wherein said scanning head is mounted to said support for rotation about an axis passing through the center of said circular information pattern.

17. The apparatus of claim 15 wherein said light conductors are groups of fibre optic reeds and the second ends of said illuminating fibre optic reeds surround said first ends of said sensing fibre optic reeds.

18. A tag reading system comprising:

a tag having photo-sensible mark receiving positions arranged in a pattern;

a support;

a scanning head mounted to said support for movement in scanning relation to said information pattern when said information bearing surface is properly positioned in a read position;

a light source fixed to said scanning head;

an illuminating light conductor mounted for movement with said scanning head, said illuminating light conductor having a first end terminating in light receiving relationship to said source and a second end terminating at a mark sensing station overlying said pattern of an information bearing surface properly located at said read station for illuminating said circular pattern; and a sensing light conductor mounted for movement with said scanning head and having a first end terminating at said mark sensing station and a second end terminating at a transducer irradiating station remote from said mark sensing station for transmitting reflected light from said sensing station to said transducer irradiating station.

19. The system of claim 18 wherein said information pattern is circular and wherein said scanning head is mounted to said support for rotation about an axis passing through the center of said circular pattern.

20. A tag reading system comprising:

a tag having photo-sensible mark receiving positions arranged in a concentric circular pattern centered about an aligner formed in the tag;

a support;

a probe mounted on said support and engageable with said aligner for properly positioning a tag in a read position;

a scanning head mounted to said support for rotation coaxial with said probe;

a light source fixed to said scanning head;

an illuminating light conductor mounted for movement with said scanning head and having a first end terminating in light receiving relationship to said source and a second end terminating at a mark sensing station for illuminating said circular pattern of a tag properly positioned in said read position; and a sensing light conductor mounted for movement with said scanning head and having a first end terminating at said mark sensing station and a second end terminating at a transducer irradiating station remote from said mark sensing station for transmitting reflected light from said sensing station to said transducer irradiating station.

References Cited

UNITED STATES PATENTS

| | | | |
|---|---|---|---|
| 3,229,074 | 1/1966 | Harrington | 235—61.11 |
| 3,237,012 | 2/1966 | Treffeisen | 250—219 |

DARYL W. COOK, *Primary Examiner.*

U.S. Cl. X.R.

250—219